W. J. REYNOLDS.
ANIMAL TRAP.
APPLICATION FILED MAR. 12, 1908.
934,695.
Patented Sept. 21, 1909.
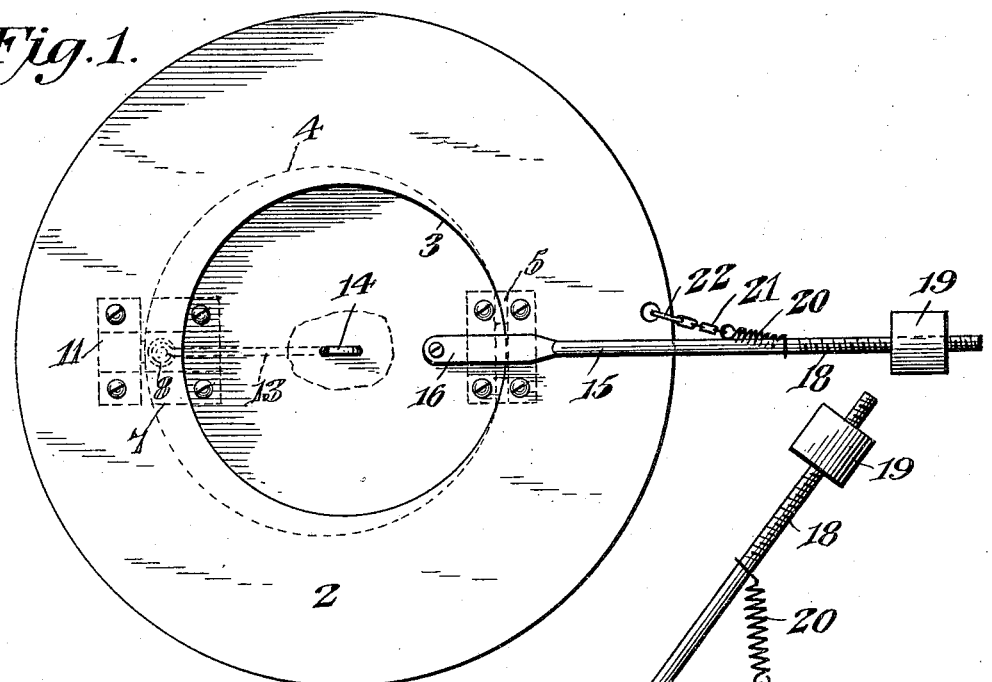
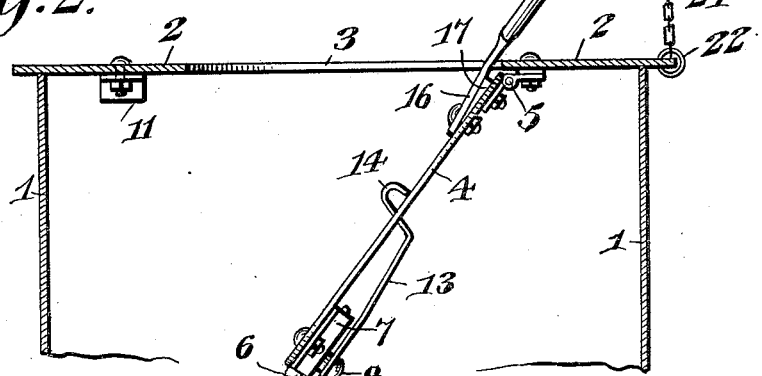
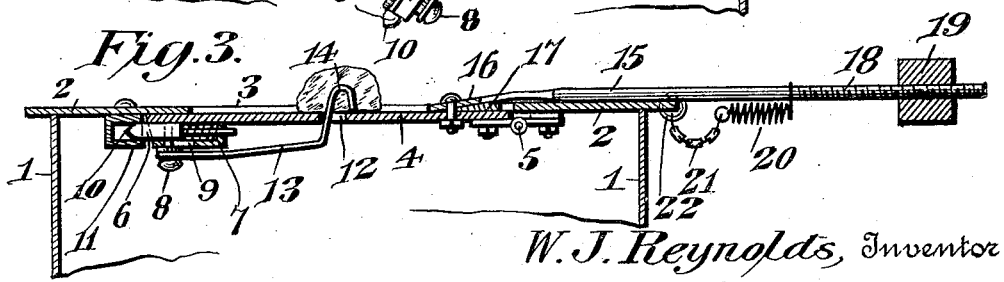
W. J. Reynolds, Inventor
Witnesses

UNITED STATES PATENT OFFICE.

WALTER JAMES REYNOLDS, OF PROVIDENCE, RHODE ISLAND.

ANIMAL-TRAP.

934,695.  Specification of Letters Patent.  Patented Sept. 21, 1909.

Application filed March 12, 1908. Serial No. 420,725.

*To all whom it may concern:*

Be it known that I, WALTER JAMES REYNOLDS, a citizen of the United States, residing at Providence, in the county of Providence and State of Rhode Island, have invented a new and useful Animal-Trap, of which the following is a specification.

The invention relates to improvements in animal traps.

The object of the present invention is to improve the construction of animal traps, and to provide a simple and comparatively inexpensive trap of great strength and durability, adapted to be automatically reset after each operation.

A further object of the invention is to provide a trap of this character, capable of ready adjustment to adapt it to the quantity of bait used and to render it as sensitive as desired.

It is also the object of the invention to provide an animal trap, which will be sprung by the animal pulling upon the bait, and which may also be adjusted so as to be sprung by the weight of the animal.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing: Figure 1 is a plan view of an animal trap, constructed in accordance with this invention. Fig. 2 is a vertical sectional view of the same, the trap being sprung. Fig. 3 is a similar view, the trap being set.

Like numerals of reference designate corresponding parts in all the figures of the drawing.

The trap, which is designed to be placed over a receptacle 1 of any character such as an ash bucket, barrel, etc., embodies a plate or body 2, constructed of sheet metal, or any other suitable material and adapted to be supported by the upper edges of the receptacle 1 and to form a cover for the same, as clearly illustrated in Figs. 2 and 3 of the drawing. The plate or body 2, which is preferably circular, is provided with a central circular opening 3 through which the animals to be captured are precipitated. The central opening 3 is normally covered by a circular trap door 4, constructed of sheet metal, or other suitable material and connected at one edge to the body portion or plate 2 by a hinge 5.

The trap door fits against the lower face of the plate, and it is provided at a point diametrically opposite the hinge 5 with a latch, having a spring actuated bolt 6. The spring actuated bolt 6 is mounted in a casing or housing 7 and provided with a headed pin 8, extending through a slot 9 of the casing or housing 7. The engaging end 10 of the bolt is oppositely beveled, and the plate or body 2 is equipped with a keeper 11, arranged at its lower face in position to be automatically engaged by the oppositely beveled bolt. The bolt is beveled at its upper face to enable it to automatically engage the keeper in the closing movement of the trap door, and it is beveled at its lower face to be readily disengaged from the keeper. The casing or housing is suitably secured to the lower face of the trap door.

The trap door is provided with a central slot 12 through which extends a bait holder, consisting of a rod 13 and an arm 14, provided at the upper end of the terminal bait engaging hook 14. The rod 13, which is located beneath the trap door, is arranged in an approximately horizontal position, when the trap door is closed, and its outer end is connected with the headed pin 8. The arm 14 extends upwardly through the slot 12, and it is fitted against the front edge of the slot 12. When the bait, which is placed on the hook, as illustrated in Fig. 3 of the drawing, is moved rearwardly or in the direction of the hinged edge of the trap door by a rat, or other animal, the bolt will be withdrawn from the keeper and the trap door will swing downward under the weight of the animal, and the latter will be precipitated into the receptacle. Should the bait be pulled in the opposite direction, the arm 14 will be fulcrumed against the front edge of the slot and will operate as a lever and withdraw the bolt from the keeper. The bait is located at the center of the trap door, and in practice the trap door will be of sufficient size to receive the animal, so that there will be no liability of an animal jumping from the trap door onto the plate when the trap is sprung.

The trap door is provided at its rear portion with an arm 15, consisting of a rod having a flattened inner portion 16, bolted to the upper face of the trap door and arranged at an inclination to clear the edge of the plate or body at the rear side of the opening 3, a tapered block or piece 17 being preferably interposed between the inner portion of the rod 15 and the trap door, as clearly shown in Fig. 3. The outer portion 18 of the arm is threaded to receive an adjustable weight 19, having a threaded opening for engaging the threads of the arm 15 and movable inwardly and outwardly to counter-balance the weight of the trap door. The weight 19 is adapted to return the trap door to its closed position, and it permits the trap to be adjusted to compensate for the weight of the bait and also to render the trap as sensitive as desired. The weight may be moved inwardly so as to exert comparatively little pressure in holding the trap door closed. This will enable the trap to be sprung by the weight of the animal resting upon the trap door.

In order to effect the quick return of the trap door after an operation of the trap, the arm 15 is connected with the plate by means of a coiled spring 20 and a chain 21. The chain 21 is provided at one end with a ring 22, which is linked into a perforation of the plate or body 2, and its other end is connected with one end of the body of the spring, the other end of the spring being secured to the arm 15 at the inner end of the threaded portion thereof. When the trap door is swung downward under the weight of an animal, the spring, which constitutes the elastic portion or member of the flexible connection, is placed under tension and causes a quick return of the trap door, which will be positively closed by the weight. The flexible connection does not interfere with the free opening movement of the trap door of a sufficient distance to cause the animal to fall into the receptacle, and the spring is placed under tension at the end of such opening movement.

As it will be impossible for an animal to obtain the bait, the trap will require no attention, and it will automatically reset itself after each operation. In practice the receptacle will be partially filled with water or some other liquid for drowning or otherwise destroying the captured animals.

Having thus fully described my invention, what I claim as new and desire to secure by Letters Patent, is:—

1. A trap comprising a horizontal plate having an opening, a trap door hinged to the lower face of the plate and having a slot and normally covering the said opening, means for automatically closing the trap door, a keeper arranged at the lower face of the plate adjacent to the opening, a latch secured to the lower face of the trap door and having a spring actuated reciprocatable bolt for engaging the keeper, and a longitudinally movable rod connected with the bolt and extending through the slot of the trap door and terminating in a bait holding hook.

2. An animal trap comprising a plate or body having an opening, a trap door hinged to the plate or body at the opening, an arm secured to the trap door, a weight adjustably mounted on the arm, and a flexible connection between the arm and the plate including a coiled spring, and an inelastic portion.

3. A trap comprising a plate having an opening, a trap door hinged to the plate, a weighted arm connected with the trap door for closing the same, and a flexible connection having an inelastic portion and provided with an elastic member and connected with the plate and with the arm for causing a quick closing movement of the trap door.

In testimony, that I claim the foregoing as my own, I have hereto affixed my signature in the presence of two witnesses.

WALTER JAMES REYNOLDS.

Witnesses:
ZEPHANIAH BROWN,
CHAS. EDWARD PAINE.